April 12, 1966 S. J. BOSCIA 3,246,249
PROGRAMMABLE DIGITAL HIGH AND LOW LIMIT DETECTOR SYSTEM
Filed March 9, 1962
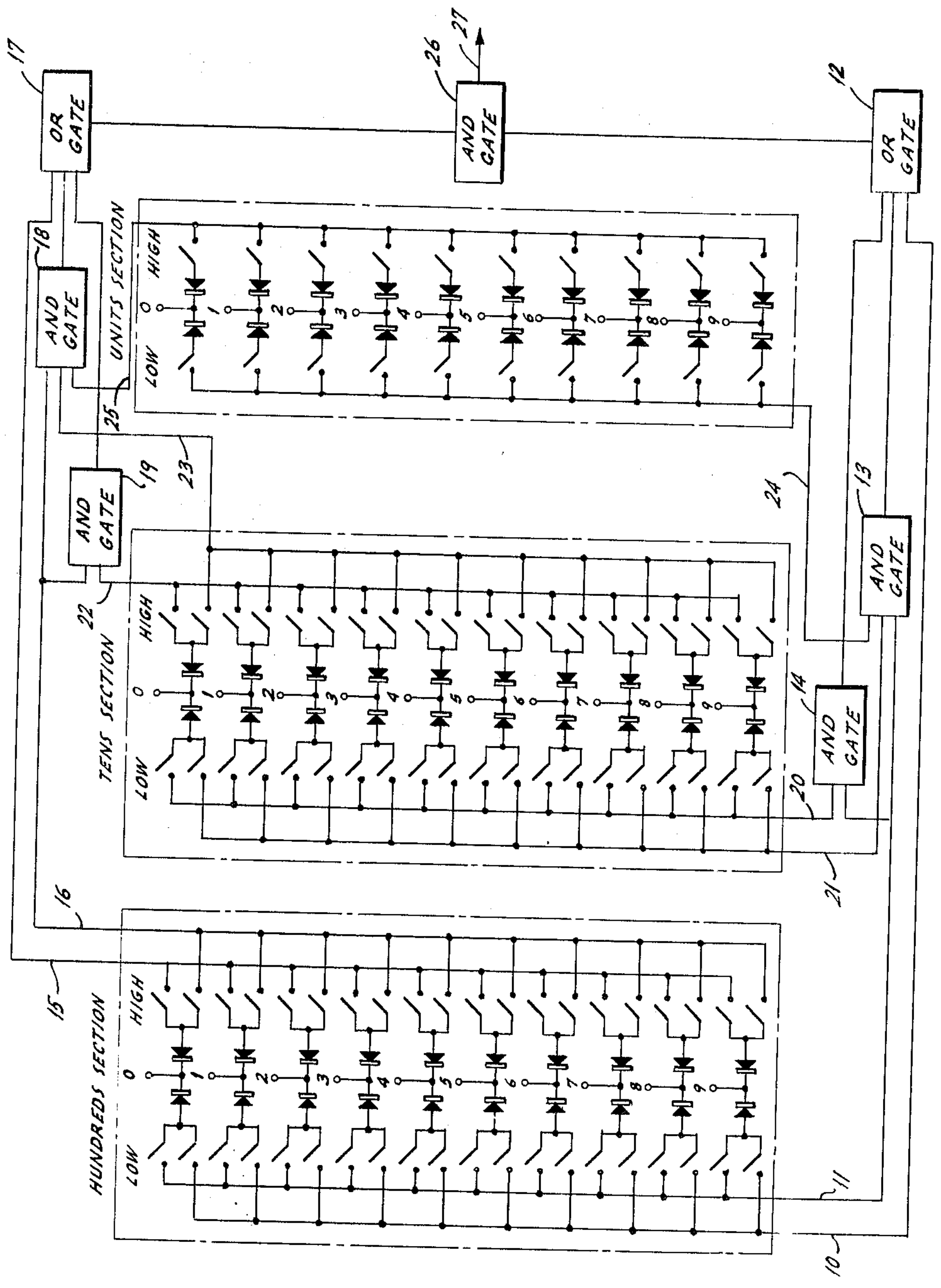
INVENTOR.
SALVATORE J. BOSCIA
BY
Fordyce A. Bothwell
ATTORNEY United States Patent Office 3,246,249
Patented Apr. 12, 1966

3,246,249

PROGRAMMABLE DIGITAL HIGH AND LOW LIMIT DETECTOR SYSTEM

Salvatore J. Boscia, Norristown, Pa., assignor to Philco Corporation, Philadelphia, Pa., a corporation of Delaware Filed Mar. 9, 1962, Ser. No. 178,671
10 Claims. (Cl. 328—146)

This invention relates to electrical testing systems and more particularly to systems for ascertaining information with respect to electrical quantities in digital form.

In some instances it is desired to determine whether some parameter is within a prescribed range. For example, in the testing of transistors it is desired to determine whether a measured parameter is within a prescribed range. To this end it is readily possible to convert such parameter to digital form by means of a digital voltmeter which is commercially available. It is then necessary to determine whether the resulting digital electrical quantity is within the prescribed range as defined by low and high numerical limits.

One object of the present invention is to provide a system for such determination.

Another object of the invention is to provide a system which enables easy setting of the digital limits that define the prescribed range.

The system provided by this invention comprises decade switches and conventional gates. The arrangement of switches is such as to enable easy setting thereof to establish the two limits defining the prescribed range. The switches and gates are interconnected in such manner that an output is produced only if a digital quantity supplied to the system is within the range established by the setting of the switches.

The invention may be fully understood from the following detailed description with reference to the accompanying drawing in which the single figure is a schematic illustration of a three-digit system according to the invention.

Referring more particularly to the drawing, the system shown is adapted for use with electrical quantities in three-digit form ranging from 000 to 999. In this system there are three sections designated respectively as "Units Section," "Tens Ssection," and "Hundreds Section." Each section has ten input terminals designated respectively 0 to 9. The input terminals may be connected to the output leads of a digital voltmeter which supplies an output of three place digital form. Thus a digital output of 127 from the digital voltmeter will apply voltages to input 1 of the hundreds section, input 2 of the tens section, and input 7 of the units section. Each section also has decade switches connected to the input terminals through diodes. The switches of each section comprise low limit switches designated "Low" and high limit designated "High."

Referring to the hundreds section, there are twenty low limit switches connected as shown to output connections 10 and 11 which are connected respectively to an OR gate 12 and to AND gates 13 and 14. There are also twenty high limit switches connected as shown to output connections 15 and 16 which are connected respectively to an OR gate 17 and to AND gates 18 and 19.

Referring to the tens section, there are twenty low limit switches connected as shown to output connections 20 and 21 which are connected respectively to AND gate 14 and to AND gate 13. There are also twenty high limit switches connected as shown to output connections 22 and 23 which are connected respectively to AND gate 19 and to AND gate 18.

Referring to the units section, there are ten low limit switches connected to output connection 24 which is connected to AND gate 13. There are also ten high limit switches connected to output connection 25 which is connected to AND gate 18.

The AND gates 13 and 14 are connected to OR gate 12, and the AND gates 18 and 19 are connected to OR gate 17. The two OR gates 12 and 17 are connected to an AND gate 26.

In operation of the system the low and high limit switches are set according to the low and high limits defining a prescribed range. Then, whenever digital voltages are applied to input terminals of the three sections, the system will determine whether the digitally represented quantity is within said range. If it is, an output will appear at the output connection 27. If it is not, there will be no output.

Suppose, for example, that the desired low and high limits defining the prescribed range are 125 and 675. In this case the switches are set as follows:

To set up the low limit 125, in the hundreds section the low limit switches which are connected to output connection 10 and which correspond to all digits greater than the hundreds digit of the low limit are closed. Thus, the switches connected to output connection 10 and to input terminals 2 to 9 are closed. The low limit switch which is connected to output connection 11 and which corresponds to the hundreds digit of the low limit is also closed. Thus, the switch which is connected to the output connection 11 and to input terminal 1 is closed.

In the tens section the low limit switches which are connected to output connection 20 and which correspond to all digits greater than the tens digit of the low limit are closed. Thus, the switches connected to output connection 20 and to input terminals 3 to 9 are closed. The low limit switch, which is connected to output connection 21 and which corresponds to the tens digit of the low limit, is also closed. Thus, the switch which is connected to output connection 21 and to input terminal 2 is closed.

In the units section the low limit switches which correspond to the units digit of the low limit and to all greater digits are closed. Thus, the low limit switches connected to input terminals 5 to 9 are closed.

With the low limit switches in the three sections set as above described, digital input voltages representing any number from 125 to 999, inclusive, will produce an input to AND gate 26. Thus any number from 125 to 129 will activate gate 13 and thus activate gate 12; any number from 130 to 199 will activate gate 14 and thus activate gate 12; and any number from 200 to 999 will activate gate 12 directly.

To set up the high limit 675, the same procedure is followed except that the high limit switches corresponding to digits lower, instead of higher, than the digits of the limit are closed. Thus, in the hundreds section the high limit switches connected to output connection 15 and to input terminals 0 to 5 are closed, and the high limit switch connected to output connection 16 and to input terminal 6 is closed. In the tens section, the high limit switches connected to output connection 22 and to input terminals 0 to 6 are closed, and the high limit switch connected to output connection 23 and to input terminal 7 is closed. In the units section, the high limit switches connected to input terminals 0 to 5 are closed.

With the high limit switches thus set, digital input voltages representing any number from 000 to 675, inclusive, will produce an input to AND gate 26. Thus any number from 000 to 599 will activate gate 17 directly; any number from 600 to 669 will activate gate 19 and thus activate gate 17; and any number from 670 to 675 will activate gate 18 and thus activate gate 17.

Thus in the three-digit system illustrated, with the switches set as above described to establish the low and high limits 125 and 675, if in any instance the digital voltages applied to input terminals of the three sections represent a three-digit number which is at least as great as 125 and no greater than 675, the OR gates 12 and 17 will both supply inputs to the AND gate 26 with the result that an output will appear at output connection 27. On the other hand, if the number represented by said digital voltages is less than 125 or greater than 675, only one of the OR gates 12 and 17 will supply an input to the AND gate 26 and there will be not output at output connection 27.

While the illustrated system has been described with specific reference to exemplary low and high limits 125 and 675, it will be apparent that the limits may have any values within the over-all range of the system, i.e., within the over-all range 000 to 999.

In the system provided by this invention, the switches may be of any suitable form. While they may be ordinary manually operated switches, it is obviously preferable that they be of a form such that they can be set with a minimum expenditure of time and effort. For example, they may be card operated switches.

While a three-digit system has been illustrated and described, it will be apparent that the invention is applicable to any number of digits that might be employed in practice. For example, it is obvious that the illustrated system could be reduced to a two-digit system or could be extended to a four-digit system merely by omitting the hundreds section or by adding a thousands section.

I claim:

1. A system for determining whether an electrical quantity in digital form is within a prescribed range defined by low and high numerical limits, comprising a plurality of sections including a units section and at least one higher order section, said sections corresponding to different digits, a plurality of input terminals in each of said sections representing respectively different numerical values of the digit to which each section corresponds, low and high limit switches connected to the input terminals in each of said sections for establishing the low and high limits of said range, AND gate means connected to low limit switches of all of said sections, a first OR gate connected to said AND gate means and to low limit switches of the highest order section for producing a signal only if a digital input applied to said input terminals is at least as great as said low limit, AND gate means connected to high limit switches of all of said sections, a second OR gate connected to the last-mentioned AND gate means and to high limit switches of the highest order section for producing a signal only if said digital input does not exceed said high limit, and an AND gate connected to said first and second OR gates for producing an output signal only in response to signals from both of said OR gates.

2. A system according to claim 1, wherein the switches in the units section comprise a single low limit switch and a single high limit switch connected to each input terminal, and the switches in each higher order section comprise a pair of low limit switches and a pair of high limit switches connected to each input terminal.

3. A system according to claim 1, wherein there are at least three sections and each of said AND gate means comprises a first AND gate connected to switches of all of said sections, and at least one additional AND gate connected to switches of sections of higher order than the units section.

4. Apparatus for determining the relation of an electrical quantity in digital form to a prescribed numerical value, comprising a plurality of sections including a units section and at least one higher order section, said sections corresponding to different digits, a plurality of input terminals in each of said sections representing respectively different numerical values of the digit to which each section corresponds, a plurality of switch means in each section connected respectively to the input terminals for establishing said prescribed numerical value, a first AND gate connected to switch means of all of said sections, at least one additional AND gate connected to switch means of sections of higher order than the units section, and an OR gate connected to said AND gates and to switch means of the highest order section for producing a signal only if a digital input applied to said input terminals bears a given relation to said prescribed numerical value.

5. Apparatus for determining the relation of an electrical quantity in digital form to a prescribed numerical value, comprising a plurality of sections including a units section and at least one higher order section, said sections corresponding to different digits, a plurality of input terminals in each of said sections representing respectively different numerical values of the digit to which each section corresponds, a plurality of switch means in each section connected respectively to the input terminals for establishing said prescribed numerical value, AND gate means connected to switch means of all of said sections, and an OR gate connected to said AND gate means and to switch means of the highest order section for producing a signal only if a digital input applied to said input terminals bears a given relation to said prescribed numerical value.

6. Apparatus according to claim 5, wherein there are at least three sections and said AND gate means comprises a first AND gate connected to switch means of all of said sections, and at least one additional AND gate connected to switch means of sections of higher order than the units section.

7. A system for determining whether an electrical signal in digital form is outside a prescribed numerical limit, comprising $n$ sections including a units section and at least one higher order section, $n$ being an integer greater than one, said sections corresponding to different digits of said electrical signal, a plurality of input terminals in each section representing respectively different numerical values of the digit to which each section corresponds, $n-1$ AND gates each having a different number of inputs between the limits of two inputs and $n$ inputs inclusive, a first output terminal for said units section, switching means for said units section operable to selectively connect the input terminals of said units section to said output terminal, first and second output terminals for each of the other sections, first and second independent switching means for each of said other sections, said first independent switching means of each of said other sections being operable to selectively connect the input terminals of that section to the first output terminal of that section, said second independent switching means of each of said other sections being operable to selectively connect the input terminals of that section to the second output terminal of that section, means connecting said first output terminal of each section to one input of a corresponding one of said AND gates, said first output terminal of said units section being connected to the AND gate having the greatest number of inputs, and said first output terminal of progressively higher order sections being connected to AND gates having progressively fewer inputs, means connecting said second output terminal of each of said sections except said units section and the highest order section to a corresponding input of each AND gate having more inputs than the AND gate to which the first output terminal of that section is connected, OR gate means, and means connecting the outputs of said AND gates and said second output terminal of said highest order section to the inputs of said OR gate means, whereby the output signal of said OR gate means is indicative of the numerical value of said electrical signal with respect to the limit established by said switching means in said sections.

8. A system according to claim 7, wherein the recited gates, output terminals, switching means and connecting means are duplicated, and an additional AND gate is connected to the two OR gate means, to enable determination of whether said electrical signal is within a prescribed range defined by two limits.

9. A system for determining whether an electrical quantity in digital form is within a prescribed range defined by low and high numerical limits, comprising a plurality of sections including a units section and at least one higher order section, said sections corresponding to different digits, a plurality of input terminals in each of said sections representing respectively different numerical values of the digit to which each section corresponds, low and high limit switches connected to the input terminals in each of said sections for establishing the low and high limits of said range, means including a plurality of gates connected to said low limit switches for producing a first signal only if a digital input applied to said input terminals is at least as great as said low limit, means including a plurality of gates connected to said high limit switches for simultaneously producing a second signal only if said digital input does not exceed said high limit, and means comprising an AND gates responsive only to both of said first and second signals for producing an output signal indicative of the fact that said digital input is within said range.

10. A system for determining whether an electrical quantity in digital form is within a prescribed range defined by low and high numerical limits, comprising a plurality of sections including a units section and at least one higher order section, said sections corresponding to different digits, a plurality of input terminals in each of said sections representing respectively different numerical values of the digit to which each section corresponds, low and high limit switches connected to the input terminals in each of said sections for establishing the low and high limits of said range, the switches in the units section comprising a single low limit switch and a single high lmit switch connected to each input terminal, the switches in each higher order section comprising a pair of low limit switches and a pair of high limit switches connected to each input terminal, means connected to said low limit switches for producing a first signal only if a digital input applied to said input terminals is at least as great as said low limit, means connected to said high limit switches for simultaneously producing a second signal only if said digital input does not exceed said high limit, and means responsive only to both of said first and second signals for producing an output signal indicative of the fact that said digital input is within said range.

References Cited by the Examiner

UNITED STATES PATENTS

| | | | |
|---|---|---|---|
| 3,019,416 | 1/1962 | Gill et al. | 340—172 |
| 3,079,554 | 2/1963 | Ranky | 328—45 X |

ARTHUR GAUSS, *Primary Examiner.*